United States Patent [19]

Spilker et al.

[11] Patent Number: 4,525,324
[45] Date of Patent: Jun. 25, 1985

[54] DRY STORAGE FACILITY FOR IRRADIATED NUCLEAR REACTOR FUEL ELEMENTS

[75] Inventors: Harry Spilker, Bad Muender; Klaus Einfeld, Murnau, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 451,938

[22] Filed: Dec. 21, 1982

[30] Foreign Application Priority Data

Dec. 24, 1981 [DE] Fed. Rep. of Germany ....... 3151310

[51] Int. Cl.³ ............... G21C 19/40; G21C 19/06; G21C 19/08
[52] U.S. Cl. ................................. 376/272
[58] Field of Search ............... 376/272, 903, 432, 434; 250/506.1, 507.1; 252/633

[56] References Cited

U.S. PATENT DOCUMENTS

| 3,935,467 | 1/1976 | Goblin | 252/633 |
| 4,063,999 | 12/1977 | Wade | 376/272 |
| 4,366,114 | 12/1982 | Kuhnel et al. | 376/272 |

FOREIGN PATENT DOCUMENTS

| 0022951 | 1/1981 | European Pat. Off. | |
| 1053109 | 10/1959 | Fed. Rep. of Germany | |
| 1614563 | 11/1972 | Fed. Rep. of Germany | 250/507.1 |
| 2814887 | 10/1979 | Fed. Rep. of Germany | 376/272 |
| 2927467 | 1/1981 | Fed. Rep. of Germany | |
| 3014252 | 10/1981 | Fed. Rep. of Germany | 376/272 |
| 3101540 | 8/1982 | Fed. Rep. of Germany | 376/272 |
| 1460558 | 12/1966 | France | |
| 0920256 | 3/1963 | United Kingdom | 376/432 |
| 2046162 | 11/1980 | United Kingdom | |
| 2089272 | 6/1982 | United Kingdom | 376/272 |

OTHER PUBLICATIONS

"Atomkernenergie Kerntechnik", Bond 35, No. 2, 1980, pp. 111-122, Hame et al.

Primary Examiner—Harold J. Tudor
Assistant Examiner—Daniel Wasil
Attorney, Agent, or Firm—Walter Ottesen

[57] ABSTRACT

The invention is directed to a dry storage facility for storing radioactive materials such as irradiated nuclear reactor fuel elements. The radioactive materials release heat generated by the radioactive decay and are held in gas-tight storage containers. The dry storage facility includes several storage modules for receiving the storage containers. The storage modules are arranged in the enclosure of the dry storage facility which can be in the form of a secure building or an underground storage cavern. A transport passageway extends alongside of the storage modules and a transport apparatus is arranged so as to be movable along this passageway. The storage containers are cooled in the storage modules by natural convection which is direct or indirect. In order to obtain an improved transfer of heat between the storage containers and the rising cooling air, the storage containers are arranged in the storage module such that the storage containers in each of two mutually adjacent planes are arranged crosswise with respect to each other. This crosswise arrangement of the storage containers leads to a swirling of the cooling air as it rises.

9 Claims, 5 Drawing Figures

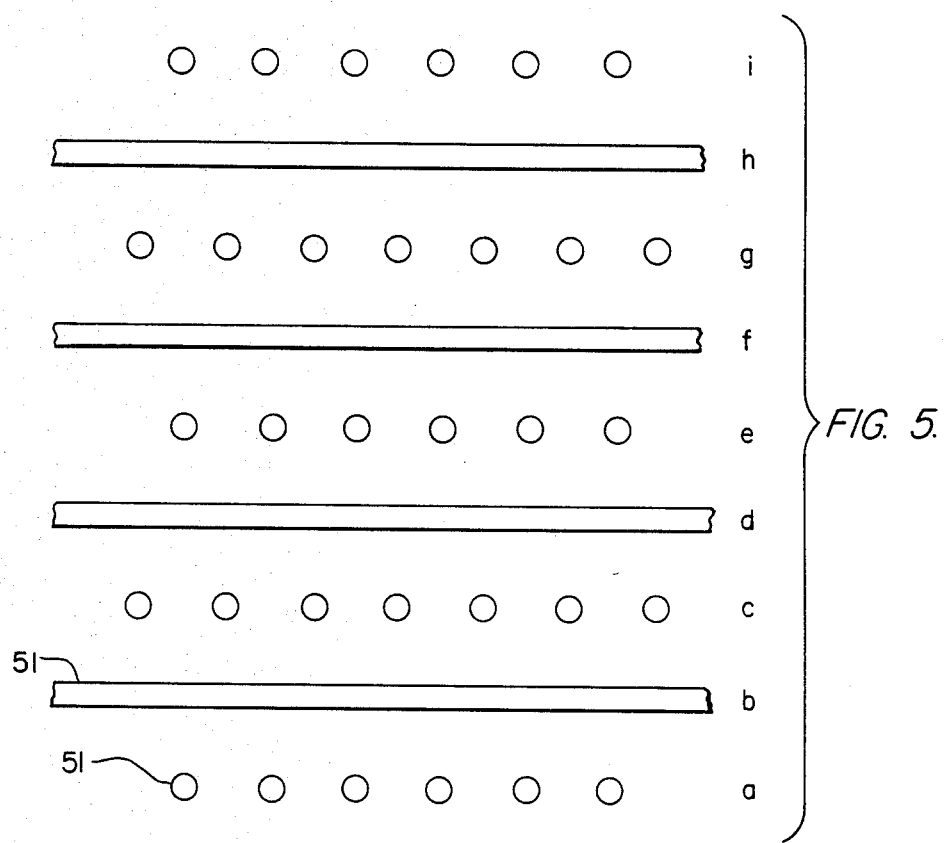

DRY STORAGE FACILITY FOR IRRADIATED NUCLEAR REACTOR FUEL ELEMENTS

Irradiated nuclear reactor fuel elements are kept in a basin filled with water where the radioactivity of the fuel elements falls off or decays with time. After a predetermined period of storage during which the heat generated by the radioactive decay falls off exponentially, the fuel elements are packed in transport containers and are brought to an interim storage facility. At this location, the fuel elements are stored before they are subjected to reprocessing.

DE-OS No. 29 29 467 discloses such an intermediate storage facility which is configured as a dry storage facility whereat the fuel elements are placed into gas-tight storage containers after being removed from the transport containers. They are then placed in several storage rooms of a longitudinally extending storage building wherein they are stacked horizontally. The storage containers are cooled by natural convection. The cooling air gradually warms and moves upwardly and transfers the heat to the ambient by means of a heat exchanger.

In a proposed embodiment of a storage room wherein the containers are horizontally stacked, horizontally arranged stationary storage tubes are provided within the room. The storage containers are packed into the storage tubes whereupon the tube is closed at its loading opening by means of a suitable plug. In this proposed embodiment, an indirect cooling of the storage containers is achieved by the rising cooling air.

SUMMARY OF THE INVENTION

It is an object of the invention to provide a dry storage facility of the kind referred to above wherein an improved transfer of heat between the rising cooling air and the storage containers or the storage tubes containing the storage containers is achieved. It is still another object of the invention to provide an arrangement of the storage tubes in a storage module which permits a substantial amount of space to be saved within the dry storage facility without reducing its storage capacity.

A dry storage facility stores radioactive materials such as irradiated nuclear reactor fuel elements that release heat produced by radioactive decay, the radioactive materials being held in gas-tight elongated storage containers. The dry storage facility of the invention includes an enclosure having a storage module disposed therein for accommodating the elongated storage containers, the latter being grouped into a plurality of sets of containers. According to a feature of the invention, the storage module includes means for holding the sets of containers in respective horizontal planes arranged one atop the other. The holding means includes ancillary holding means for holding each two mutually adjacent ones of the sets so as to cause the containers in one plane to be disposed in a direction transverse to the containers in the next adjacent plane. Convection cooling means is provided for cooling the storage containers. The enclosure of the dry storage facility can be, for example, an underground storage facility or a specially reinforced concrete building with very thick walls.

This crosswise arrangement of the elongated storage containers causes a swirling of the rising cooling air which always flows into the intermediate spaces defined by the storage containers or storage tubes and which spaces are covered from above by the next layer of storage containers or storage tubes. The formation of an upward verically rising laminar flow is almost completely prevented so that the heat transferred to the available air is improved.

In a further advantageous embodiment of the invention, the storage room or module includes a plurality of storage tubes for holding corresponding ones of the storage containers, the storage tubes being grouped into a plurality of sets of storage tubes. The sets are mounted in the storage module in respective horizontal planes one atop the other with the tubes of each set extending in a direction transverse to the tubes of the next adjacent set. The tubes of each set also extend longitudinally at an angle to the longitudinal direction of the transport passageway. This arrangement of the storage tubes permits a saving to be realized in the floor space of the storage facility. The width of the transport passageway between the storage modules on both sides of the storage facility and the width of the track of the crane-like transport vehicle can be configured so as to be narrower than heretofore because the loading of the storage modules is conducted at an angle with respect to both the transport passageway and the track of the bridge crane of the transport vehicle.

The sets of storage tubes in the storage module are stacked as described above. According to another feature of the invention, every other one of the sets of storage tubes of a storage module is arranged therein so that the longitudinal axes of the tubes extend in a first direction; whereas, the tubes of the remaining sets of storage tubes of the module extend in a second direction transverse to the first direction. The tubes of every other one of the sets extending in the first direction are laterally displaced from the tubes of the next adjacent set of tubes extending in the first direction; and, the tubes of every other one of the sets extending in the second direction are laterally displaced from the tubes of the next adjacent set of tubes extending in the second direction.

Because of this advantageous arrangement of the storage tubes and the storage containers placed therein, the rising cooling air is caused to continuously change its direction as it rises in the module through the stack of storage tubes and is thereby swirled. This swirling action increases the contact of the rising cooling air with the surfaces of the storage tubes thereby increasing the quantity of heat transferred to and conducted away by the cooling air.

According to a further feature of the invention, each of the storage modules can be configured as a separate block-like unit having a square base and being bounded on its four sides by vertical walls with two diagonally opposite corners of the unit defining a vertical diagonal plane bisecting the unit into two triangular halves. The storage modules are arranged along the side of the transport passageway so as cause the diagonal plane to extend parallel to the longitudinal direction of the passageway.

Because of this arrangement of the storage modules with respect to the transport passageway, two of the vertical walls face the passageway and the storage module can be loaded in crosswise fashion with elongated storage containers through both of the last-mentioned vertical walls. More specifically, the storage module can be loaded with respective sets of storage containers which lie crosswise to each other. In this way, a very effective use of space is made possible in the storage area of the enclosure wherein the storage modules are arranged.

With the arrangement above, one of the triangular halves of each of the storage modules faces the passageway whereas the other one of the triangular halves of each of the storage modules faces away from the passageway. The transport facility in the enclosure includes a bridge crane and overhead guide means such as guide rails for guiding the bridge crane above and along the transport passageway. According to a further feature of the invention, the triangular half of each of the storage modules facing the passageway can be configured so as to permit the overhead guide means to be disposed thereover. Also, and according to another feature, the other triangular half of the storage module is adapted to accommodate an exhaust conduit thereabove for conducting away the cooling medium from the storage module.

With the above arrangement of the storage modules, both the transport passageway and the area taken up by the passageway and the storage modules as a group can be dimensioned so as to be narrower. The transport vehicle travels above half of the storage modules along the transport passageway. Half of the surface region of each storage module facing the passageway can be used for loading operations. The space requirements for the loading operation of the storage modules is therefore held to a minimum. The other triangular half of each storage module serves as an exhaust conduit which can be connected to a main exhaust conduit.

BRIEF DESCRIPTION OF THE DRAWING

The invention will now be described with reference to the drawing wherein:

FIG. 5 is a schematic representation showing an alternate configuration of the storage tubes mounted in a storage module.

DESCRIPTION OF THE PREFERRED EMBODIMENTS OF THE INVENTION

Figure 1:
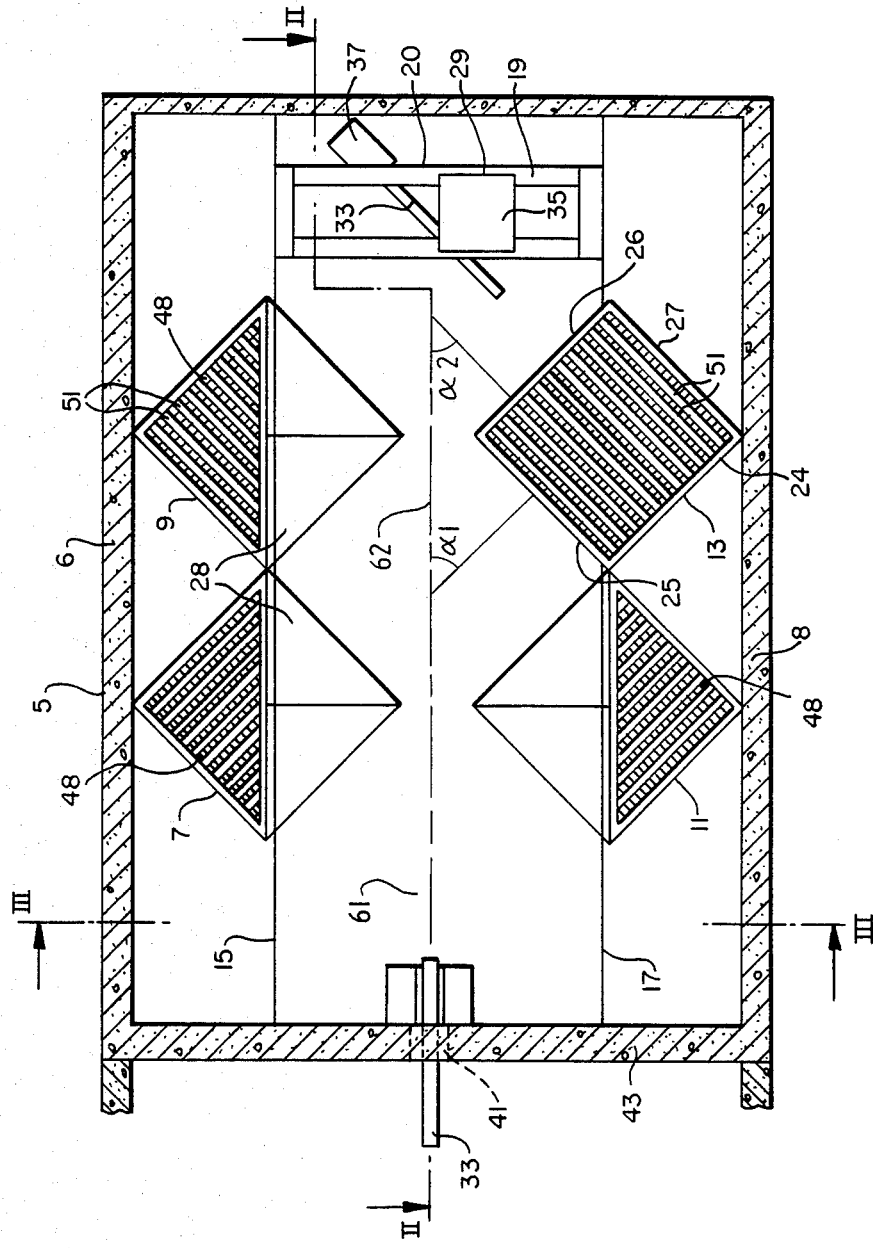
FIG. 1 is a plan view of a longitudinally extending storage building of a dry storage facility taken along line I—I of FIG. 2.
Figure 2:
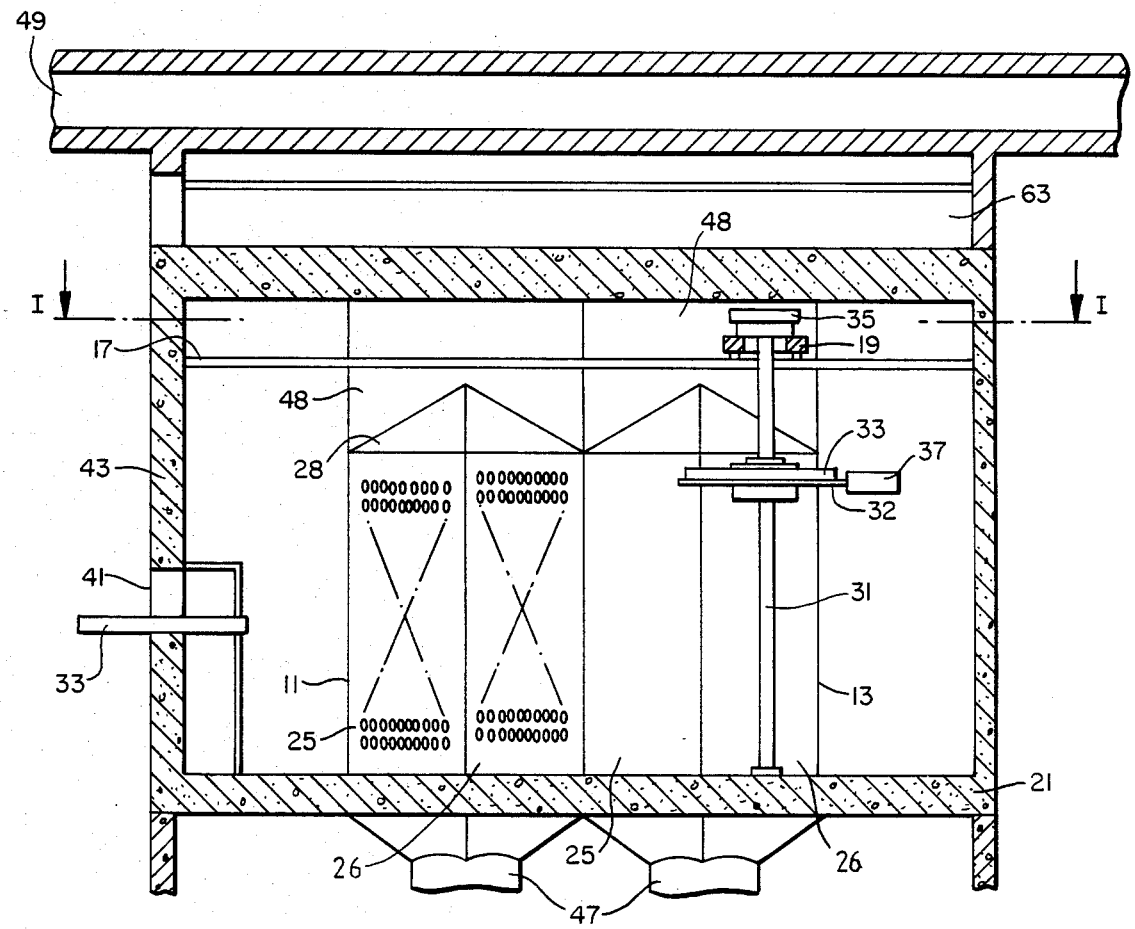
FIG. 2 is an elevation view, partially in section, taken along the line II—II of FIG. 1.

Reference numeral 5 designates a longitudinally-extending storage building of a dry storage facility. The building 5 contains storage modules 7, 9, 11 and 13. Storage modules 7 and 9 are arranged on one longitudinal side of the building and storage modules 11 and 13 are on the other longitudinal side thereof. Storage module 13 is shown without any covering. Each of the storage modules is configured as a separate unit and has a square base area. The modules are arranged in the building 5 so that the diagonal plane defined by one pair of diagonally opposite vertical corners of each module extends in a direction parallel to the longitudinal walls 6 and 8 of the building 5.

Supporting and guiding rails 15 and 17 are mounted in the building 5 and extend in a direction parallel to the longitudinal walls 6 and 8. A bridge crane 19 is mounted on the rails 15 and 17 so as to be movable therealong.

The supporting rail 15 extends approximately over the diagonal planes of respective storage modules 7 and 9; whereas, rail 17 extends approximately over the diagonal planes of storage modules 11 and 13. The storage building 5 includes a base plate 21 made of concrete in which are formed four square openings 23 for receiving the storage modules 7, 9, 11 and 13, respectively. Each of the storage modules 7, 9, 11 and 13 is bounded by vertical concrete walls 24, 25, 26 and 27 with a concrete top covering 28.

The supporting rails 15 and 17 upon which the bridge crane 19 runs are fixedly mounted above the storage modules 7, 9, 11 and 13.

The bridge crane 19 is part of a transport vehicle 20 which includes a transport apparatus 29 movable in a direction transverse to the supporting rails 15 and 17 of bridge crane 19. The transport apparatus 29 includes a transport mast 31, a receiving apparatus 32 for receiving the storage containers 33 and a small vehicle 35. The receiving apparatus 32 is rotatably mounted on the mast and is provided with a pushing apparatus 37 which can move the storage containers 33 out of the receiving apparatus 32 in the direction of the longitudinal axis of the containers 33. The containers 33 are used to store irradiated nuclear reactor fuel rods and can be 4 to 5 meters in length and have a diameter of approximately 0.38 meters.

A pass-through opening 41 is provided in the concrete wall 43 at the entrance of the storage building 5 through which the individual storage containers 33 can be brought into the storage building 5.

The storage modules 7, 9, 11 and 13 are supplied with fresh cooling air via an air inlet conduit 45 of large cross section and branch conduits 47. The storage modules are fed by the branch conduits 47. The cooling air warms as it rises and is directed by exhaust conduit 48 to a main exhaust conduit 49. An exhaust conduit 48 is arranged atop each of the storage modules and extends over the triangular half section of each storage module facing away from the transport passageway 61. The other triangular half section of each module 7, 9, 11 and 13 is provided with a roof-like concrete covering 28 above which the transport vehicle 20 can run.

Figure 4:
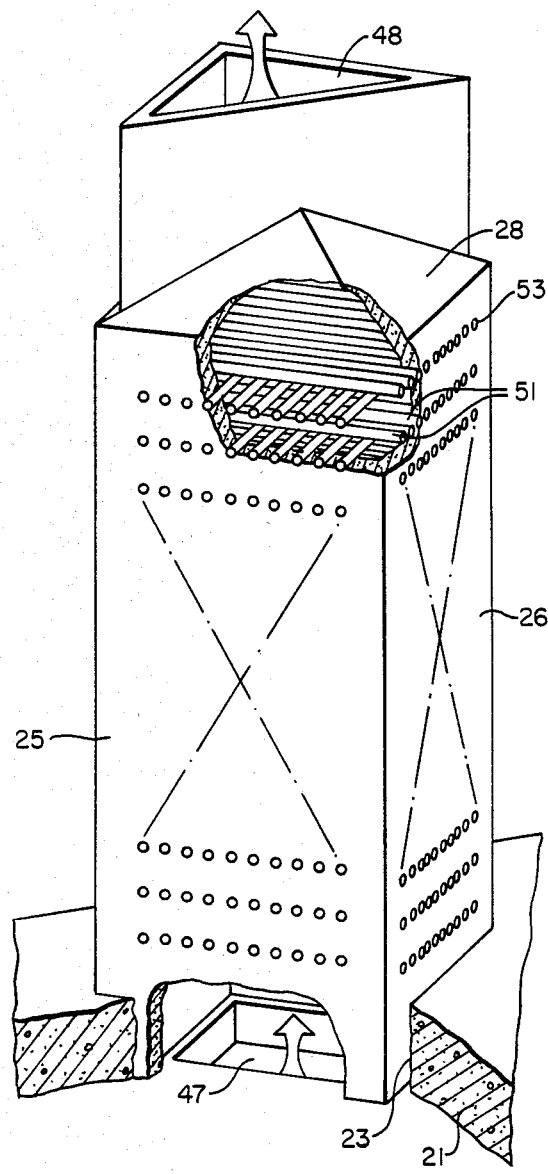
FIG. 4 is a perspective view of a storage module having a portion thereof broken away to show the storage tubes for accommodating the elongated containers containing irradiated nuclear fuel elements.

Storage tubes 51 are arranged in the storage modules 7, 9, 11 and 13 so that they are stacked horizontally in sets with one set atop the other as shown in FIG. 4. The back end of each storage tube 51 is held by a suitable mounting arrangement embedded in concrete walls 24, 27; whereas the front ends of the storage tubes are supported in respective bores 53 in the front concrete walls 25 and 26 of each storage module 7, 9, 11 and 13, the walls 25 and 26 facing toward the transport passageway 61 extending through the storage building 5 in the longitudinal direction thereof as indicated by axis 62. The storage tubes 51 are also sealed about their periphery at the bores 53.

The storage tubes 51 arranged parallel to one another in one horizontal plane extend in a direction transverse to the storage tubes lying in the next adjacent horizontal plane as shown in FIG. 4. The storage containers 33 holding irradiated nuclear reactor fuel elements are pushed into these storage tubes 51. The openings of the tubes 51 are then tightly sealed with plugs.

Figure 3:
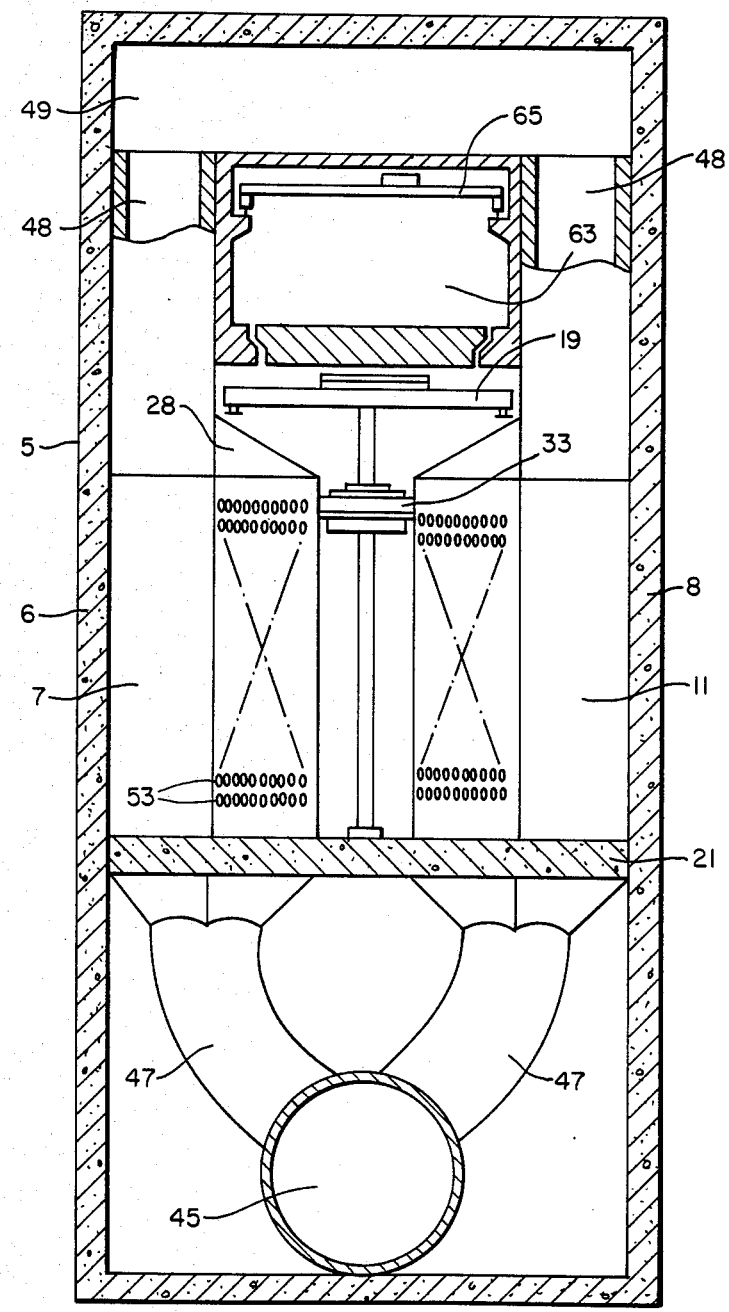
FIG. 3 is a section view taken through the storage building along line III—III of FIG. 1.

Referring to FIGS. 3 and 4, the cooling air flowing through the air inlet conduit 45 is caused to flow via branch conduits 47 up through the storage modules 7, 9, 11 and 13 by the chimney effect. This cooling air is continuously directed away from the vertical direction as it passes upwardly through the storage modules 7, 9, 11 and 13 by the layers of storage tubes 51 arranged crosswise as shown. This leads to a swirling effect and to a good heat transfer between the storage tubes 51 and the quantity of cooling air which is available. In this way, the indirect cooling of the storage containers 33 is increased.

Referring to FIG. 5 and according to another preferred embodiment of the invention, the storage tubes 51 in horizontal plane c are displaced laterally from the tubes disposed in horizontal plane a so that there is a gap in horizontal plane c directly above each one of the tubes of horizontal plane a. Also, the tubes of plane d are laterally displaced from the tubes of plane b in the same manner as discussed above for planes c and a. This pattern is repetitive and extends up the storage module as shown substantially in FIG. 5.

As mentioned above, with the arrangement shown in FIG. 5, the storage tubes of plane a always have an open gap directly above the plane c and so on. The upwardly flowing cooling air is continuously deflected and swirling of the cooling air is increased thereby increasing the contact of flowing air with the outer surfaces of the storage tubes; this improves the transfer of heat to the upwardly flowing cooling air from irradiated fuel elements held within storage containers in the storage tubes 51.

An intervention room 63 extends above the rails 15 and 17 of the bridge crane. An auxiliary crane 65 is movably mounted within the room 63. The intervention room 63 is shielded by means of concrete walls.

The transport passageway 61 between the mutually adjacent storage modules 7 and 9 on the one side and storage modules 11 and 13 on the other side, can have a narrow width which must only be somewhat larger than the width of the transport mast 31. The storage tubes 51 of the storage modules 7, 9, 11 and 13 are loaded in the direction of their longitudinal axes which is at acute angles α1 and α2 to the longitudinal direction 62 of transport passageway 61 (FIG. 1). The storage containers 33 are passed through the concrete walls 25 and 26 of the storage modules 7, 9, 11 and 13 facing the passageway 61.

The transport passageway 61 can be configured to have a narrow width because storage tubes 51 in the storage modules are loaded in a direction which forms an acute angle with respect to the longitudinal direction of the passageway 61. By making the passageway 61 narrower, a savings in floor space within the building 5 is realized.

It is understood that the foregoing description is that of the preferred embodiments of the invention and that various changes and modifications may be made thereto without departing from the spirit and scope of the invention, as defined in the appended claims.

We claim:

1. Dry storage facility for storing radioactive materials such as irradiated nuclear reactor fuel elements releasing heat produced by radioactive decay, the radioactive materials being held in gas-tight, elongated storage containers defining respective longitudinal axes, the dry storage facility comprising:
   an enclosure;
   a plurality of upwardly extending storage modules disposed in said enclosure for accommodating said elongated storage containers;
   said elongated storage containers being grouped into a plurality of sets of containers;
   each of said storage modules including first holding means for holding a first portion of said sets of containers in respective ones of a first group of horizontal planes arranged one atop the other;
   said storage module including second holding means for holding the remaining portion of said sets in respective ones of a second group of horizontal planes interlayered in interdigital fashion with said first group of horizontal planes;
   said first holding means and said second holding means being arranged in said module so as to cause the longitudinal axes of the containers in one plane to be disposed so that the respective longitudinal axes thereof are disposed crosswise with respect to the longitudinal axes of the containers in the next adjacent plane;
   the longitudinal axes of the containers in every other one of said first group of horizontal planes being horizontally displaced from the respective longitudinal axis of the containers in the next adjacent horizontal plane of said first group;
   the containers in every other one of said second group of horizontal planes being laterally displaced from the containers in the next adjacent horizontal plane of said second group; and,
   convection cooling means for conducting cooling air through said storage modules to cool said containers.

2. Dry storage facility for storing radioactive materials such as irradiated nuclear reactor fuel elements releasing heat produced by radioactive decay, the radioactive materials being held in gas-tight, elongated storage containers, the dry storage facility comprising:
   an enclosure having an elongated transport passageway extending therethrough;
   at least two storage modules;
   each of said modules including a plurality of storage tubes for holding a corresponding plurality of said containers, said storage tubes being grouped into a plurality of sets of storage tubes, said sets of storage tubes being mounted in said storage module in respective horizontal planes one atop the other with the longitudinal axes of the tubes of each set extending in a direction crosswise to the longitudinal axes of the tubes of the next adjacent set;
   each of said storage modules being a separate block-like unit having a square base and being bounded on its four sides by vertical walls with two diagonally opposite corners of said unit defining a vertical diagonal plane bisecting the unit into two triangular halves; said storage modules being arranged along the side of said transport passageway so as to cause said diagonal plane to extend parallel to the longitudinal direction of said passageway;
   a movable transport facility arranged in said enclosure so as to be movable along said transport passageway for transporting and loading said containers into said storage tubes of said storage modules; and,
   convection cooling means for conducting cooling air through said storage modules to cool said containers.

3. The dry storage facility of claim 2 comprising:
   a plurality of said storage modules arranged within said enclosure, a first portion thereof being disposed on one side of said passageway and the remaining portion of said modules being disposed on the other side of said passageway.

4. The dry storage facility of claim 3, the tubes of each of said sets in each of said storage modules being mounted therein so as to cause their respective longitudinal axes to extend at an acute angle with respect to the longitudinal direction of said transport passageway.

5. The dry storage facility of claim 3 wherein:
every other one of the sets of storage tubes of a storage module is arranged therein so that the longitudinal axes of said tubes extend in a first direction; whereas, the tubes of the remaining sets of storage tubes of said module extend in a second direction transverse to said first direction;
the tubes of every other one of said sets extending in said first direction being laterally displaced from the tubes of the next adjacent set of tubes extending in said first direction; and
the tubes of every other one of said sets extending in said second direction being laterally displaced from the tubes of the next adjacent set of tubes extending in said second direction.

6. The dry storage facility of claim 4, each of said storage modules being a separate block-like unit having a square base and being bounded on its four sides by vertical walls with two diagonally opposite corners of said unit defining a vertical diagonal plane bisecting the unit into two triangular halves; said storage modules being arranged along the side of said transport passageway so as to cause said diagonal plane to extend parallel to the longitudinal direction of said passageway.

7. The dry storage facility of claim 6, one of said triangular halves of each of said storage modules facing said passageway whereas the other one of said triangular halves of each of said storage modules facing away from said passageway;
said transport facility including a bridge crane and overhead guide means for guiding said bridge crane above and along said transport passageway; said one triangular half of each of said storage modules being configured so as to permit said overhead guide means to be disposed thereover;
said convection cooling means including an exhaust conduit arranged atop the other triangular half of each of said storage modules for conducting away the cooling medium from the storage module.

8. Dry storage facility for storing radioactive materials such as irradiated nuclear reactor fuel elements releasing heat produced by radioactive decay, the radioactive materials being held in gas-tight, elongated storage containers, the dry storage facility comprising:
an enclosure having an elongated transport passageway extending therethrough;
a plurality of storage modules arranged within said enclosure, a first portion thereof being disposed on one side of said passageway and the remaining portion of said modules being disposed on the other side of said passageway, each of said storage modules being a separate block-like unit having a square base and being bounded on its four sides by vertical walls with two diagonally opposite corners of said unit defining a vertical diagonal plane bisecting the unit into two triangular halves; said storage modules being arranged along the side of said transport passageway so as to cause said diagonal plane to extend parallel to the longitudinal direction of said passageway, one of said triangular halves of each of said storage modules facing said passageway whereas the other one of said triangular halves of each of said storage modules facing away from said passageway;
each one of said storage modules including a plurality of storage tubes for holding a corresponding plurality of said elongated storage containers, said storage tubes of each of said modules being disposed therein so as to be able to receive said containers through at least one of the vertical walls of said one triangular half;
convection cooling means communicating with said storage modules for passing a cooling medium therethrough for cooling said storage containers; and,
a movable transport apparatus arranged in said enclosure so as to be movable along said transport passageway for transporting and loading said containers into said storage tubes through at least said one vertical wall of said one triangular half.

9. The dry storage facility of claim 8, said storage tubes of each one of said storage modules being grouped into a plurality of sets of storage tubes, said sets of storage tubes being mounted in said storage module in respective horizontal planes one atop the other with the tubes of each set extending in a direction transverse to the tubes of the next adjacent set thereby enabling a portion of said sets to be loaded through one of said vertical walls of said one triangular half and the remainder of said sets to be loaded through the other one of said walls of said one triangular half.

* * * * *

UNITED STATES PATENT AND TRADEMARK OFFICE
CERTIFICATE OF CORRECTION

PATENT NO. : 4,525,324

DATED : June 25, 1985

INVENTOR(S) : Harry Spilker and Klaus Einfeld

It is certified that error appears in the above-identified patent and that said Letters Patent is hereby corrected as shown below:

In column 1, between the title and line 5: add the subtitle -- BACKGROUND OF THE INVENTION --.

In column 2, line 2: delete "verically" and substitute -- vertically -- therefor.

In column 2, line 57: after "so as", add -- to --.

In column 6, line 23: delete "laterally" and substitute -- horizontally -- therefor.

Signed and Sealed this

Third Day of June 1986

[SEAL]

Attest:

DONALD J. QUIGG

Attesting Officer

Commissioner of Patents and Trademarks